Nov. 8, 1960 W. E. HOWALD ET AL 2,958,933
METHOD FOR FABRICATING HOLLOW BLADES
Filed July 22, 1955 4 Sheets-Sheet 1
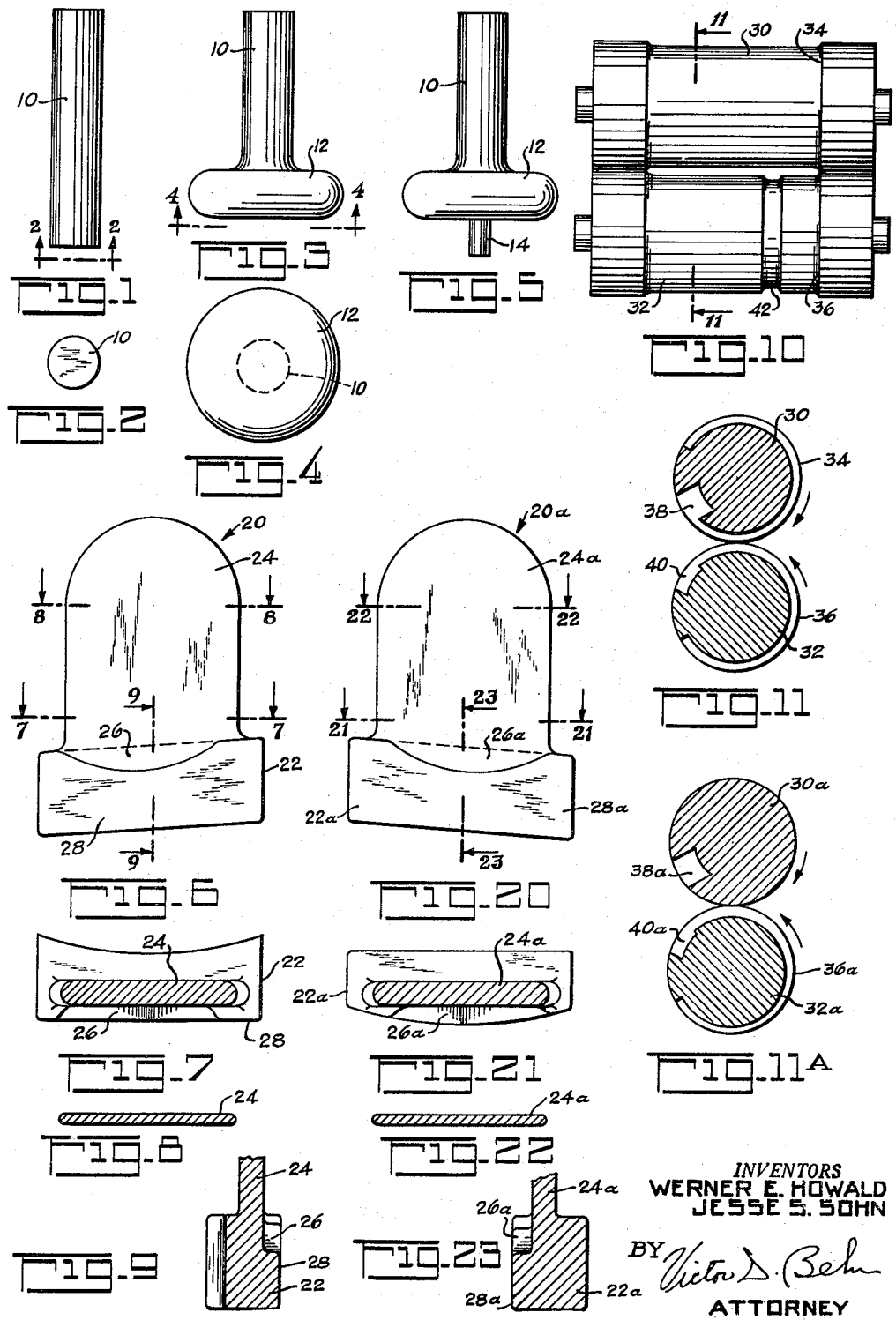
INVENTORS
WERNER E. HOWALD
JESSE S. SOHN
BY
ATTORNEY Nov. 8, 1960   W. E. HOWALD ET AL   2,958,933
METHOD FOR FABRICATING HOLLOW BLADES
Filed July 22, 1955   4 Sheets-Sheet 2

INVENTORS
WERNER E. HOWALD
JESSE S. SOHN
BY
Victor D. Behn
ATTORNEY

Nov. 8, 1960 W. E. HOWALD ET AL 2,958,933
METHOD FOR FABRICATING HOLLOW BLADES
Filed July 22, 1955 4 Sheets-Sheet 2

INVENTORS
WERNER E. HOWALD
JESSE S. SOHN
BY
Victor D. Behn
ATTORNEY

Nov. 8, 1960 W. E. HOWALD ET AL 2,958,933
METHOD FOR FABRICATING HOLLOW BLADES
Filed July 22, 1955 4 Sheets-Sheet 4

INVENTORS
WERNER E. HOWALD
JESSE S. SOHN
BY
*Victor D. Behn*
ATTORNEY

United States Patent Office 2,958,933
Patented Nov. 8, 1960

2,958,933

METHOD FOR FABRICATING HOLLOW BLADES

Werner E. Howald, Ridgewood, and Jesse S. Sohn, Succasunna, N.J., assignors to Curtiss-Wright Corporation, a corporation of Delaware Filed July 22, 1955, Ser. No. 523,722

7 Claims. (Cl. 29—156.8)

This invention relates to blades for turbines, compressors or the like and is particularly directed to a novel hollow blade and a novel method of fabricating such a blade.

Making turbine and compressor blades hollow for reducing the weight of such blades and/or to permit internal cooling of the blades is well known. An object of the present invention comprises the provision of a novel and simple method for making a novel and improved hollow blade for turbines, compressors or like apparatus.

In accordance with the invention each blade is fabricated by first making two halves which are then brazed together. Each blade half is formed with lands along its leading and trailing edges connected together across the end of the blade root, said lands mating with corresponding lands on the complementary blade half so that when said halves are brazed together the blade has a hollow construction which extends down into the blade root.

For convenience of description the surface of each blade half which in the finished blade faces the complementary blade half is termed the "inner" surface.

Other objects of the invention will become apparent upon reading the annexed detailed description in connection with the drawing in which:

Figs. 1–5 inclusive illustrate preliminary steps in the forming of the bar stock from which the blade halves are fabricated and of these figures, Figs. 2 and 4 are end views taken along lines 2—2 and 4—4 respectively of Figs. 1 and 3;

Figs. 6–9 inclusive and Figs. 12–19 inclusive illustrate steps in forming the convex half of the blade and of these figures, Figs. 7, 8 and 9 are sectional views taken along lines 7—7, 8—8 and 9—9 respectively of Fig. 6, Figs. 13, 14 and 15 are sectional views taken along lines 13—13, 14—14 and 15—15 respectively of Fig. 12; and Figs. 17 and 18 are sectional views taken along lines 17—17 and 18—18 respectively of Fig. 16;

Fig. 10 is a side view of the forging rolls;

Fig. 11 is a sectional view taken along line 11—11 of Fig. 10;

Fig. 11a is a view similar to Fig. 11 but illustrating a modified roll construction;

Figs. 20–30 are views similar to Figs. 6–9 and 12–18 respectively but for the concave half of the blade;

Fig. 35 illustrates a new step, and Fig. 36 corresponds to Fig. 14.

Figure 12:
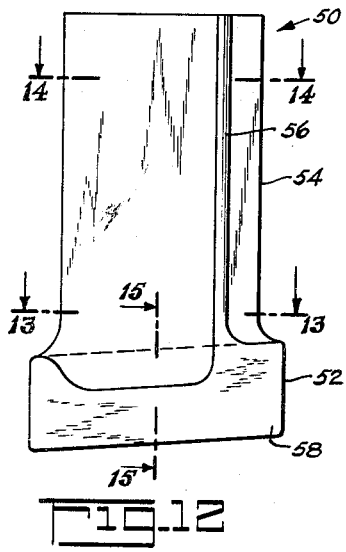
Figure 24:
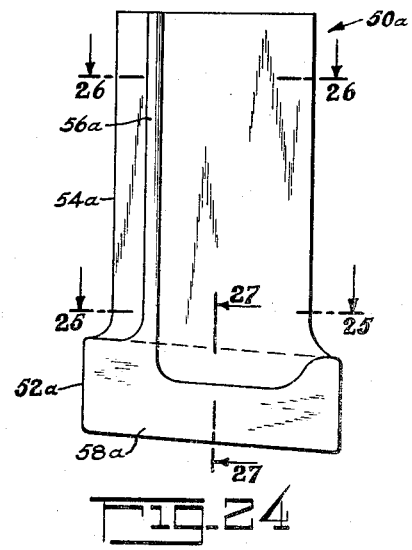
Figure 13:
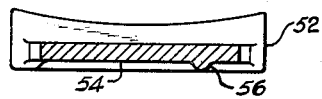
Figure 25:
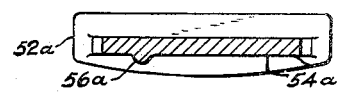
Figure 14:
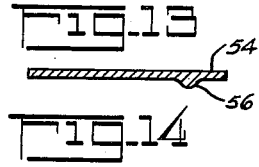
Figure 26:
Figure 15:
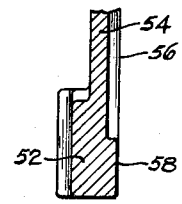
Figure 27:
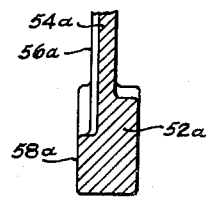

Referring to the drawing, a bar 10 (Figs. 1 and 2) for example of a suitable steel alloy, is used as the starting material from which a blade half is fabricated. The bar 10 preferably is a length of hot rolled stock which has been centerless ground to remove all trace of decarburization. One end of the bar 10 is axially upset by a conventional hot heading operation to form an enlarged head 12 (Figs. 3 and 4) one one end of the bar. This enlarged head 12 provides the material for forming the root end of a blade half.

As illustrated in Fig. 5, a tang 14 may be welded on the head of the bar 10 merely to facilitate handling of the bar during the subsequent forging operation.

The headed bar 10 can be used to form either the concave or convex half of the blade. Fabrication of a convex blade half will be described first.

A bar 10, headed as indicated at 12 in Figs. 3–5, is first cleaned and then copper plated to protect the steel during the subsequent forging operation. The headed bar 10 is then hot forged in suitable dies to form a blank 20 (Figs. 6–9) from which the convex half of the blade is formed. In Figs. 6–9 the tang 14 and the flash resulting from the forging have been removed from the blank 20. The blank 20 comprises a relatively thick root part 22 and a relatively thin blade-like part 24 integral with and extending from said root part. The blade-like part 24 is generally flat and preferably progressively decreases in thickness from its root end to its outer end. The convex airfoil face of the finished blade is formed from said blade-like part 24. The blade-like part 24 preferably extends from points close to the surface (inner surface) of said root part which when finished is to abut the corresponding surface on the concave blade half. Thus, as can be seen in Fig. 7, the junction of the blade-like part 24 and the root part 22 is close to the inner surface of said root part. A portion of the inner surface of said root part adjacent to said junction and between the edges of said blade-like part is recessed as indicated at 26 so that said recessed surface portion forms a continuation of the adjacent surface of the blade-like part 24 and the remainder of the inner surface of said root part comprises a land 28 disposed about said recessed portion. The remainder of the root part 22 projects laterally beyond the blade-like part 24 to such an extent that there is sufficient material in said root part to form half of the root end of the finished blade.

After said hot forging operation, the blank 20 is again cleaned of all scale and replated with copper. The blade-like part 24 of the blank is then roll forged by means of forge rolls 30 and 32 such as illustrated in Figs. 10 and 11. Preferably the roll forging operation is performed cold, that is, without the application of external heat. As shown, half of the desired profile of the blade-like part 24 is formed in each roll. Thus the rolls 30 and 32 have recesses 34 and 36 respectively for rolling the blade-like part to the desired form. Preferably the blade-like part 24 is rolled so that it is tapered in thickness throughout at least a substantial portion of its length with the thickness decreasing from the root end toward the other or tip end of said part. As illustrated, the recesses 34 and 36 progressively decrease in depth from their root ends for producing a corresponding progressive decrease or taper in the thickness of the blade-like part 24 from its root to its tip end as a result of the cold roll forging operation by the rolls 30 and 32. The roll recesses 34 and 36 have relatively deep portions 38 and 40 at the root ends of said recesses for receiving the root part 22 of the blank 20. In addition, a longitudinal groove 42 is formed in the recess 36 for raising a rib on one surface (the inner surface) of the blade-like part.

Obviously only one of the forging rolls needs to have a recess for rolling the blade-like part 24 to the desired form. Such a modification of the forging rolls is illustrated in Fig. 11a. The parts of Fig. 11a have been designated by the same reference numerals as the corresponding parts of Figs. 10 and 11 except a subscript *a* has been added thereto. In Fig. 11*a* the roll 30*a* has a right circular cylindrical shape with no recess except for the recess 38*a* to receive one side of the blank root part. The roll 32*a* has a tapered recess 36*a* and a relatively deep recess 40*a* for the other side of the blank root part. With this arrangement the entire roll forging taper in the blade-like part 24 is the result of the recess 36*a* in the roll 32*a*. A longitudinal groove such as the groove 42 would also be formed in the roll 32*a*.

After the cold roll forging operation the blank, now designated by reference numeral 50, has the shape illustrated in Figs. 12–15, the outer end of its blade-like part having been trimmed square. The root part 52 of the blank is substantially unchanged. The blade-like part 54 of the blank is now substantially flat and the amount of material at each transverse section of the blade-like part 54 is only slightly in excess of the material required in the finished blade at this section. The thickness of the blade-like part 54 progressively decreases from its root end to its tip or outer end. Also, this thickness is constant across any transverse section except for the rib 56 which has been rolled into the inner surface of the blank by the groove 42 in the forging roll 32. The rib 56 extends along the trailing edge of said blade-like part adjacent to but spaced from said edge. The surface of the rib 56 forms a continuation of the land surface 58 (designated 28 in Figs. 6–9) of the root part 52.

Preferably, the roll forging operation comprises several passes through the forging rolls. If the leading and trailing edges of the rolled blank and the rib 56 are to be parallel to each other, as illustrated, then the same set of forging rolls 30 and 32 may be used for all of the roll forging passes. Thus for the first pass the rolls are spaced apart from their position illustrated and for each successive pass the rolls are moved closer together.

The blank is annealed at the end of the cold roll forging operation as well as between each pass through the roll forging rolls. The nature of the annealling operation depends on the particular material being used. For example if the blade is being made of a stainless steel defined by specification No. AISI 410 of the American Iron and Steel Institute, the annealing operation may comprise heating for one hour at 1550° F. followed by a furnace cooling, said heating and cooling taking place in a protective atmosphere such as dry hydrogen or dissociated ammonia.

Figure 16:
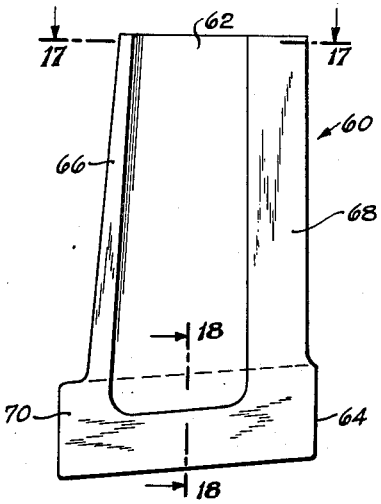
Figure 28:
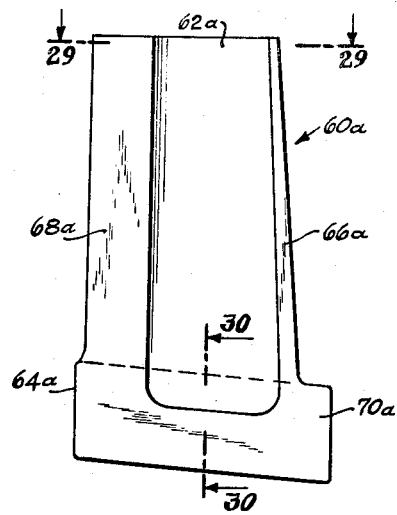
Figure 17:
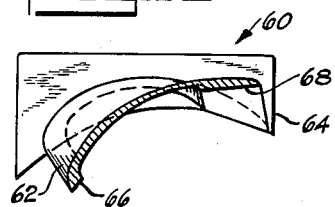
Figure 29:
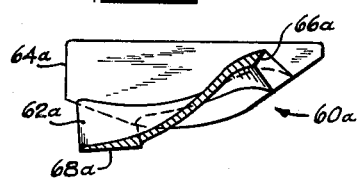
Figure 18:
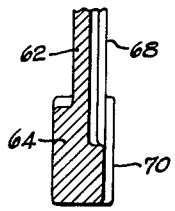
Figure 30:
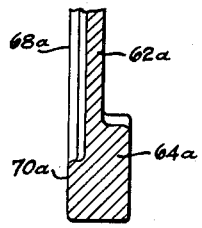

The blank is then placed between cold forging pressure dies and cold forged to the desired shape illustrated in Figs. 16–18. The blank is now designated by reference numeral 60. As is apparent in Fig. 17 a twist has been given to the blank blade-like part now designated by reference numeral 62 and this part of the blank has been shaped so that its transverse sections are curved with its outer surface being convex. At the same time the root part 64 of the blank is formed so that its inner surface is now concave and of substantially the same curvature as the inner surface of the adjacent portion of the blade-like part 62. In addition lands 66 and 68 have been raised, by said cold forging operation, along the leading and trailing edges of the blade on its inner surface, the surface of said lands 66 and 68 forming a continuation of the land surface 70 (designated 58 in Figs. 12–15) of the root part 64.

Figure 19:
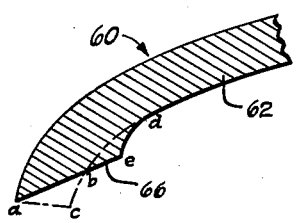

The manner in which the land 66 is formed is shown in the enlarged view of Fig. 19. As there shown, the material in the triangle *abc* in effect is displaced transversely across the inner surface of the blade away from its leading edge to form the triangle *bed* thereby forming the raised land 66.

The land 68 at the trailing edge of the blade is much wider than the land 66 at the blade leading edge. With the tough materials required for turbine and compressor blade it is quite difficult if not impossible to displace material from the trailing edge of the blade sufficiently far to form the entire width of the land 68. This is the reason for first forming the rib 56 during the cold roll forging operation. The rib 56 provides the material for forming the portion of the land 68 most remote from the trailing edge of its blade half.

From the above description it is apparent that the volume of material at each section of the blade-like part after the rolling operation is substantially that required to form the finished shape of the blade at said section and except for the leading and trailing edges the thickness of said part at each transverse section is substantially that desired in the finished blade at said section. In the cold pressure forging operation, following the rolling operation, the leading and trailing edge lands of the blade-like part are formed by laterally displacing material at said edges.

The pressure forging operation, following the rolling operation, preferably is performed cold, as described, as distinguished from a hot forging operation. This permits a more accurate control of the blade dimensions and avoids surface effects such as oxidation etc. For some materials a certain amount of external heat may be desirable in both the cold rolling and in the subsequent pressure forging operations but each operation preferably would still be performed below the recrystallization temperature of the material and therefore would be a cold forging operation.

The concave half of the blade is fabricated from a headed bar 10 (Fig. 5) in a manner similar to the aforedescribed fabrication of a convex half. Hence no detailed description of the fabrication of a concave blade half is deemed necessary and, for ease of understanding, the parts of a concave blade half in its various stages of fabrication have been designated by the same reference numerals but with a subscript *a* added thereto as the corresponding parts of the convex blade half.

Figure 31:
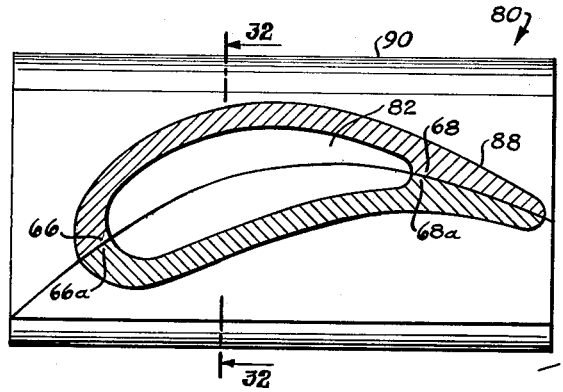
Fig. 31 is an enlarged transverse sectional view through the completed blade adjacent to the root portion of the blade.
Figure 32:
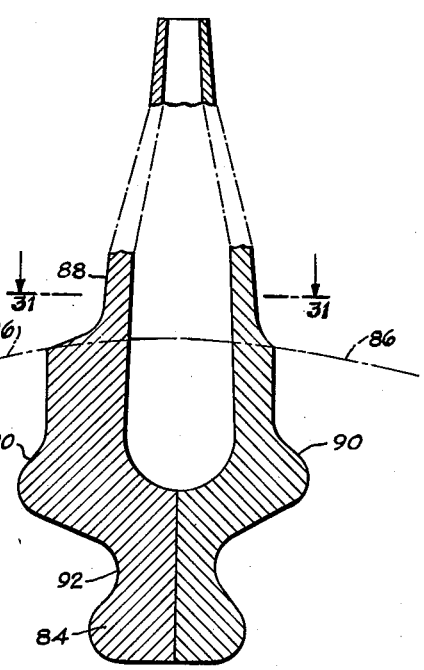
Fig. 32 is a sectional view taken along line 31—31 of Fig. 30 and illustrating the blade mounted in a rotor of a compressor, turbine or like apparatus.

The lands 66, 68, 70, 66*a*, 68*a* and 70*a* on the convex and concave blade halves are then machined and/or ground so that the lands of a convex blade half match and fit against the lands of a concave blade half. The two halves 60 and 60*a* are then brazed together by brazing the abutting lands together as illustrated in Figs. 31 and 32, to form a blade 80 having a hollow space 82 therein. In addition, in Figs. 31 and 32 the root end 84 of the blade 80 has been machined to the desired external configuration. Except for surface finishing operations the blade is now complete.

The formation of the lands along the edges of the blade permits machining the lands to obtain the desired accuracy in the fit of the blade halves and makes it unnecessary to roll or pressure forge the blade halves to a sharp or feather edge.

In Figs. 31 and 32 the dot and dash line 86 designates the periphery of the compressor or turbine rotor to which the root part 84 of each blade is anchored and from which its blade-like or airfoil part 88 projects radially outwardly. As illustrated the blade hollow 82 not only extends the length of the airfoil part 88 but also extends a substantial distance into the root part 84 of the blade. Thus the hollow 82 extends below the root part shoulders 90, which carry the centrifugal loads on the blade and terminates short of the minimum area section 92 of said root part. This feature adds materially to the lightness of the blade construction.

Figure 33:
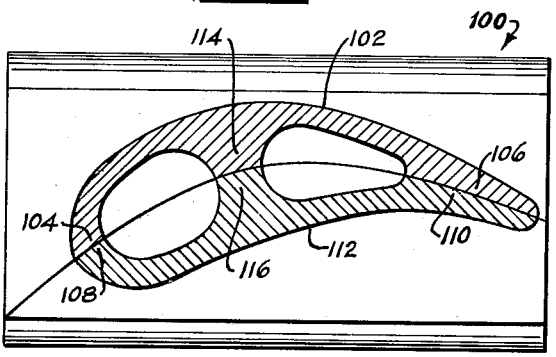
Figs. 33, 34, 35 and 36 illustrate a modified construction. Of these views, Fig. 33 corresponds to Fig. 31, Fig. 34 corresponds to Fig. 8.

As a modified construction, the blade can be made with a longitudinal central rib or ribs. Such a blade 100 is illustrated in Fig. 33. As there illustrated the convex blade half 102 has lands 104 and 106 along its leading and trailing edges which are brazed to lands 108 and 110 extending along the leading and trailing edges of the concave blade half 112. In addition the convex and concave blade halves have ribs 114 and 116 respectively extending longitudinally of the blade intermediate said leading and trailing edge lands. Preferably and as illustrated, the ribs 114 and 116, like said lands, abut each other when the blade halves are placed in position for brazing said halves together and therefore said ribs as well as said lands are brazed together. Even if the ribs 114 and 116 do not contact each other, however, they will serve to stiffen their respective blade faces. Except for the ribs 114 and 116 the blade 100 is like the blade 80 and is made in a similar manner.

Figure 34:
Figure 35:
Figure 36:

With the illustrated blade construction of Fig. 33 the height of the ribs 114 and 116 is quite large and therefore material for these ribs is provided in the initial hot forging operation. Thus Fig. 34 illustrates a central longitudinal rib 120 in the blank. Fig. 34, like Fig. 8, illustrates a section of the blank after the hot forging operation and except for the rib 120 is like Fig. 8. In the subsequent cold roll forging operation a longitudinal central rib 122 is first rolled along both surfaces of the blank, as shown in Fig. 35. Then in a final cold roll forging operation against a flat roll on one side, such as the roll 30a of Fig. 11a, the rib 122 on one surface of the blank, in effect, is forced out the other surface into the other rib 122 to form one large rib 124. The toughness and brittleness of the material of the blank limits the height to which a rib or land can be raised in a cold roll forging operation. The procedure outlined in Figs. 34 and 35 almost doubles the height to which a rib can be raised on one surface of a blank by cold roll forging as compared to a procedure in which the entire roll forging of the rib is performed on only one side of the blank. Fig. 36 shows the condition of the blank after the completion of the cold roll forging operation and therefore corresponds to Fig. 14. The blank of Fig. 36 is then cold forged to the shape of one of the blade halves illustrated in the enlarged view of Fig. 33. For example, if the convex blade half is formed from the blank of Fig. 36 then the rib 124 forms the rib 114 of the finished blade while if the concave blade half is formed then the rib 124 forms the rib 116 of the finished blade.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. The method of making a hollow blade for turbines, compressors or the like; said method comprising the steps of forging two separate complementary blanks, one for each face of the blade and the adjacent half of the blade root with each blank having a root part and a blade-like part extending therefrom; cold roll-forging each blank so that its blade-like part is rolled substantially flat; cold pressure-forging each blank to substantially the desired shape and twist of its blade half and at the same time raising lands along the leading and trailing edges of the inner face of said blade half; and then joining said two blade halves together along said raised lands.

2. The method of making a hollow blade for turbines, compressors or the like; said method comprising the steps of forging two separate complementary blanks, one for each face of the blade and the adjacent half of the blade root with each blank having a root part and blade-like part extending therefrom; cold roll-forging each blank so that its blade-like part is rolled substantially flat and the thickness of said blade-like part progressively decreases throughout at least a substantial portion of its length from its root end to its other end with the thickness of said blade-like part being generally constant across any transverse section of the blade-like part; cold pressure-forging each blank to substantially the desired shape and twist of its blade half and at the same time raising lands along the leading and trailing edges of the inner face of said blade half; and then joining said two blade halves together along said raised lands.

3. The method of making a hollow blade for turbines, compressors or the like; said method comprising the steps of forging two separate complementary blanks, one for each face of the blade and the adjacent half of the blade root with each blank having a root part and a blade-like part extending therefrom and with the portion of the inner surface of the root part adjacent to the blade-like part and between the edges of said blade-like part being recessed to leave a raised land across the root end and along the edges of said root part inner surface; cold roll-forging each blank so that its blade-like part is rolled substantially flat with a rib extending along the inner surface of said blade-like part adjacent to but spaced from the trailing edge of said blade-like part; cold pressure-forging each blank to substantially the desired shape and twist of its blade half and at the same time raising lands along the leading and trailing edges of the inner surface of said blade half, said rib being used to help form the trailing edge raised land so as to make said trailing edge raised land wider than the leading edge raised land; and then joining said two blade halves together along said raised lands.

4. The method of making a hollow blade for turbines, compressors or the like; said method comprising the steps of forging two separate complementary blanks, one for each face of the blade and the adjacent half of the blade root with each blank having a root part and a blade-like part extending therefrom and with the portion of the inner surface of the root part adjacent to the blade-like part and between the edges of said blade-like part being recessed to leave a raised land across the root end and along the edges of said root part inner surface; cold roll-forging each blank so that its blade-like part is rolled substantially flat and the thickness of said blade-like part progressively decreases throughout at least a substantial portion of its length from its root end to its other end with a rib extending along the inner surface of said blade-like part adjacent to but spaced from the trailing edge of said blade-like part except for said rib the thickness of said blade-like part being generally constant across any transverse section of said blade-like part; cold pressure-forging each blank to substantially the desired shape and twist of its blade half and at the same time raising lands along the leading and trailing edges of the inner surface of said blade half, said rib being used to help form the trailing edge raised land so as to make said trailing edge raised land wider than the leading edge raised land; and then joining said two blades halves together along said raised lands.

5. The method of making a hollow blade for turbines, compressors or the like; said method comprising the steps of forging two separate complementary blanks, one for each face of the blade and the adjacent half of the blade root with each blank having a root part and a blade-like part extending therefrom; cold roll-forging each blank so that its blade-like part is rolled substantially flat and each transverse section of the blade-like part has generally a constant thickness and has substantially the required amount of material to form the finished blade at said section and for the major portion of said section, except for its leading and trailing edge portions, has substantially the desired thickness of the finished blade; cold pressure-forging each blank to provide said blank with the desired shape and twist of its blade half and to form raised lands along the leading and trailing edges of the inner surface of said blade half; and then joining said blade halves together along said raised lands.

6. The method of making a hollow blade for turbines, compressors or the like; said method comprising the steps of forging two separate complementary blanks, one for each face of the blade and the adjacent half of the blade root with each blank having a root part and a blade-like part extending therefrom and with the portion of the inner surface of the root part adjacent to the blade-like part and between the edges of said blade-like part being recessed to leave a raised land across the root end and along the edges of said root part inner surface; cold roll-forging each blank so that its blade-like part is rolled substantially flat and each transverse section of the blade-like part has substantially the correct amount of material to from the finished blade at said section and for the major portion of said section, except for its leading and trailing edge portions, has substantially the desired thickness of the finished blade; cold pressure-forging each blank to provide said blank with the desired shape and twist of its blade half and to form raised lands along the leading and trailing edges of the inner surface of said blade half by displacing material laterally at said edges such that said leading and trailing edge lands form a smooth continuation of said raised land of the root part of said blank; and then joining said blade halves together along said raised lands.

7. The method of making a hollow blade for turbines, compressors or the like; said method comprising the steps of forging two separate complemenatry blanks, one for each face of the blade and the adjacent half of the blade root with each blank having a root part and a blade-like part extending therefrom; cold roll forging each blank so that its blade-like part is rolled substantially flat with a rib extending along the inner surface of said blade-like part adjacent to but spaced from the trailing edge of said blade-like part; cold pressure forging each blank to substantially the desired shape and twist of its blade half and at the same time raising lands along the leading and trailing edges of the inner surface of said blade half, said rib being used to help form the trailing edge raised land so as to make said trailing edge raised land wider than the leading edge raised land; and then joining said two blade halves together along said raised lands.

References Cited in the file of this patent
UNITED STATES PATENTS

| | | |
|---|---|---|
| 2,013,622 | Bedford | Sept. 3, 1935 |
| 2,231,888 | Couch | Feb. 18, 1941 |
| 2,394,124 | Warren | Feb. 5, 1946 |
| 2,394,353 | Zellbeck | Feb. 5, 1946 |
| 2,427,785 | Hoover | Sept. 23, 1947 |
| 2,457,202 | Brady | Dec. 28, 1948 |
| 2,473,245 | Hanna | June 14, 1949 |
| 2,487,860 | Enos | Nov. 15, 1949 |
| 2,514,525 | Stullen | July 11, 1950 |
| 2,675,208 | Weinberg | Apr. 13, 1954 |
| 2,736,948 | Barnes | Mar. 6, 1956 |

FOREIGN PATENTS

| | | |
|---|---|---|
| 946,056 | France | May 23, 1949 |